US010359692B2

(12) United States Patent
Chen

(10) Patent No.: US 10,359,692 B2
(45) Date of Patent: Jul. 23, 2019

(54) LASER ILLUMINATION SYSTEM AND METHOD FOR ELIMINATING LASER SPECKLE THEREOF

(71) Applicant: National Taiwan University of Science and Technology, Taipei (TW)

(72) Inventor: Chih-Hsiao Chen, New Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 0 days.

(21) Appl. No.: 15/864,556

(22) Filed: Jan. 8, 2018

(65) Prior Publication Data

US 2019/0064539 A1    Feb. 28, 2019

(30) Foreign Application Priority Data

Aug. 22, 2017 (TW) .............................. 106128435 A

(51) Int. Cl.
*G03B 21/20* (2006.01)
*G02B 27/48* (2006.01)
*G02B 5/18* (2006.01)

(52) U.S. Cl.
CPC ....... *G03B 21/2033* (2013.01); *G02B 5/1828* (2013.01); *G02B 27/48* (2013.01)

(58) Field of Classification Search
CPC ... G02B 27/48; G02B 5/1828; G03B 21/2033
See application file for complete search history.

(56) References Cited

U.S. PATENT DOCUMENTS

| 2005/0029464 A1* | 2/2005 | Babayoff | G02B 21/0056 |
| | | | 250/370.08 |
| 2010/0202725 A1* | 8/2010 | Popovich | G02B 27/48 |
| | | | 385/10 |
| 2015/0370081 A1* | 12/2015 | Kurashige | G02B 5/32 |
| | | | 359/19 |

* cited by examiner

*Primary Examiner* — Sultan Chowdhury
*Assistant Examiner* — Magda Cruz
(74) *Attorney, Agent, or Firm* — Muncy, Geissler, Olds & Lowe, P.C.

(57) ABSTRACT

A laser illumination system and a method for eliminating laser speckles thereof are revealed. The laser illumination system includes laser module emitting a laser beam, a scanning unit for scanning the laser beam to form scanning beams, and a diffractive optical element which the scanning beams are passed through to form illuminating beams that are projected to an area to be illuminated or an object. Thus an image detecting unit can capture an image of the area or the object. The scanning beams are converted into the illuminating beams by the diffractive optical element that causes changes in spatial phase redistribution or light energy distribution thereof. One point in the area or on the object shows energy of partial light of at least two of the laser beams. Thus a laser speckle of the image can be eliminated by the superposition of the energy of the partial light.

2 Claims, 4 Drawing Sheets

LASER ILLUMINATION SYSTEM AND METHOD FOR ELIMINATING LASER SPECKLE THEREOF

BACKGROUND OF THE INVENTION

The present invention relates to a laser illumination system and a method for eliminating laser speckles thereof, especially to a laser illumination system with at least one diffractive optical element and a method for eliminating laser speckles thereof by superposition of light energy. The diffractive optical element is disposed on a pathway of a laser beam being emitted to an area to be illuminated. Thus laser beams emitted have changes in spatial phase redistribution or light energy distribution while being passed through the diffractive optical element. One point in the area to be illuminated shows energy of partial light of at least two of the laser beams and superposition of the energy of the partial light within the reaction time of the image detecting unit. Therefore the laser speckle of the image of the area to be illuminated captured by the image detecting unit can be eliminated by the superposition of energy of the partial light of the laser beams.

Laser beam, a high energy light beam, is coherent because of the same wavelength, phase, frequency and direction of propagation. Laser speckle occurs while the laser is used as a light source in a projector. A coherent light source is emitted to a rough surface such as a projection screen or a translucent diffuser plate. The light intensity distribution of the projected image is irregular due to constructive or destructive interference of scattered light at different points of the rough surface. The higher light intensity is resulted from constructive interference while the lower light intensity is resulted from destructive interference. In fact, the laser speckle is a noise that is detected by an image detection unit (such as human eyes or lenses) and is degrading definition and resolution of the image detected. The viewing comfort is affected once the image detection unit is human eyes. Thus the speckle problem of the laser illumination system should be solved.

There are certain solutions for solving the problems of laser speckles available now. For example, a projection screen is added with an actuator such as motor used for driving the screen to keep on moving or rotating. Thus coherence of the laser beams is destroyed so as to reduce the interference. Or a lens is used to focus an image generated by an image generator module onto a moveable or rotatable time-varying diffuser for destroying coherence of laser light and reducing speckles on the image. The diffuser uses high frequency vibration that results in disordered phase difference to make the observers' eyes unable to see contrast between light and dark areas of the light spots. Thus the speckle is reduced or even eliminated. However, the above devices or method use the actuator for driving the screen or the time-varying diffuser to move or rotate. The whole structure is more complicated so that not only the production cost is raised, the volume is also increased.

The quantum efficiency of laser is hundreds or thousands of times than that of LED while being applied to illumination systems. The laser has features of smaller volume, less heat generated and higher directionality so that Nobel Prize winner Shuji Nakamura believes that the LED will be replaced by laser in the next decade. However, the laser illumination technique has the following challenges in practice. First the laser produces light in a very narrow wavelength band so that there is no white laser. The second the laser light is highly directional and this has generated safety concerns. The third laser speckle resulted from coherent interference of laser light makes the observer feel uncomfortable, reduces the visibility or even severely limits resolution. In order to solve the above problems of laser, Shuji Nakamura and OSRAM project laser light onto a phosphor coating for generating on-coherent white light with low directionality. Yet the energy conversion between the laser light and the phosphor coating with different wavelength reduces the quantum efficiency of the illumination system. The light generated by phosphor has no directionality. Once the light is passed through the reflection mirror and the lenses for correcting energy distribution and matching requirements of the respective illumination or application of the display, the energy efficiency is significantly decreased and the system volume is increased. On the other hand, the laser light can be used as an ideal light source once the above three problems have been solved and no phosphor conversion is needed owing to its advantages such as the high quantum efficiency, compact volume, high directionality, long detection distance and high visibility. Thus the laser light can be applied to not only white-light illumination but also a night vision system or machine vision. Moreover, the light source of the present system can not only be applied to various lights such as headlights, desk lamps, street lights, etc., but also display systems that need an additional light source such as LCD (liquid crystal display) LCoS (Liquid crystal on silicon), etc. Now the applications of the white-light laser are around the corner. Thus the present invention focus on the design of the laser illumination system and how to solve the problems of laser speckles.

SUMMARY OF THE INVENTION

Therefore it is a primary object of the present invention to provide a laser illumination system that can eliminate laser speckles of images captured by superposition of energy of partial light of laser beams.

In order to achieve the above object, a laser illumination system according to the present invention includes at least one laser module that emits a laser beam, at least one scanning unit used for scanning the laser beam to form scanning beams, and at least one diffractive optical element which the scanning beams are passed through to form illuminating beams. Then the illuminating beams are projected to an area to be illuminated or at least one object in the area to be illuminated for illumination. Thus at least one image detecting unit can capture an image of the area to be illuminated or the object. The image detecting unit can be human eyes or an e. The image detecting unit has reaction time that is defined as how long the impression of an image remains on human eyes or the sensing and responding time of the optical sensor. In the present invention, the reaction time means the shortest response time of the image detecting unit. The scanning beams are converted into the illuminating beams by the diffractive optical element that provides diffraction effects and causes changes in spatial phase redistribution or light energy distribution of the scanning beams while the scanning beams being passed through the diffractive optical element. Thereby one point in the area to be illuminated or on the object in the area to be illuminated shows energy of partial light of at least two of the illuminating beams. Thus laser speckles of the image captured by the image detecting unit can be eliminated by superposition of the energy of the partial light of the illuminating beams.

The diffractive optical element further includes an effective diffraction zone that causes changes in spatial phase redistribution or light energy distribution of the scanning beams and converts the scanning beams into the illuminating beams while the scanning beams being passed through the effective diffraction zone. Thus the illuminating beams further form an effective illumination area within the area to be illuminated.

The diffractive optical element is disposed on a pathway of scanning beams being projected from the scanning unit to the area to be illuminated/or the object. Thus the scanning beams have changes in spatial phase redistribution or light energy distribution while being passed through the diffractive optical element in a reflective way or in a transmissive way.

The diffractive optical element is selected from the group that includes a micro-optical diffractive element, a bulk optic, a diffuser and a combination thereof according to light energy and phase distribution required.

In the laser illumination system, a plurality of different laser modules forms a laser module matrix. Each laser module is further added with a collimator, a focusing element, etc. for limiting the laser beams more aligned in a specific direction to be projected to the scanning unit.

The laser module matrix can be further added with a plurality of sets of wavelength filters, a plurality of sets of polarizing filters, etc for different laser beams into the same laser beam and performing time adjustment according to laser energy output.

The scanning unit performs one-dimensional scanning or two-dimensional scanning while the scanning path can be cyclic or acyclic. The cyclic scanning path can be Raster scanning or Lissajous scanning, whose scanning cycle is shorter than the reaction time of the image detecting unit. As to the acyclic scanning path, the light energy distribution is adjusted along with changes in time of the scanning path.

The scanning unit is a light-beam bending device that includes, but not limited to, a refractive index beam steering device, a reflecting mirror, a MEMS mirror, a MEMS rotating mirror, a rotating mirror, a polygon mirror, an ultrasonic grating and a combination thereof.

It is another object of the present invention to provide a method for eliminating laser speckles of a laser illumination system that includes a plurality of steps.

Step 1: providing a laser illumination system. The laser illumination system includes at least one laser Module that emits a laser beam, at least one scanning unit used for scanning the laser beam to form scanning beams, and at least one diffractive optical element which the scanning beams are passed through to form illuminating beams. Then the illuminating beams are projected to an area to be illuminated or at least one object in the area to be illuminated for illumination. Thus an image detecting unit can capture an image of the area to be illuminated/or the object. The image detecting unit can be human eyes or an optical sensor. The image detecting unit has reaction time that is defined as how long the impression of an image remains on human eyes or the sensing and responding time of the optical sensor.

Step 2: converting the scanning beam into the illuminating beam by diffraction of the diffractive optical element that causes changes in spatial phase redistribution or light energy distribution of the scanning beam while the scanning beam being passed through the diffractive optical element.

Step 3: eliminating a laser speckle of the image captured by the image detecting unit by superposition of energy of partial light of at least two of the illuminating beams shown on one point in the area to be illuminated or on the object in the area to be illuminated within the reaction time of the image detecting unit.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
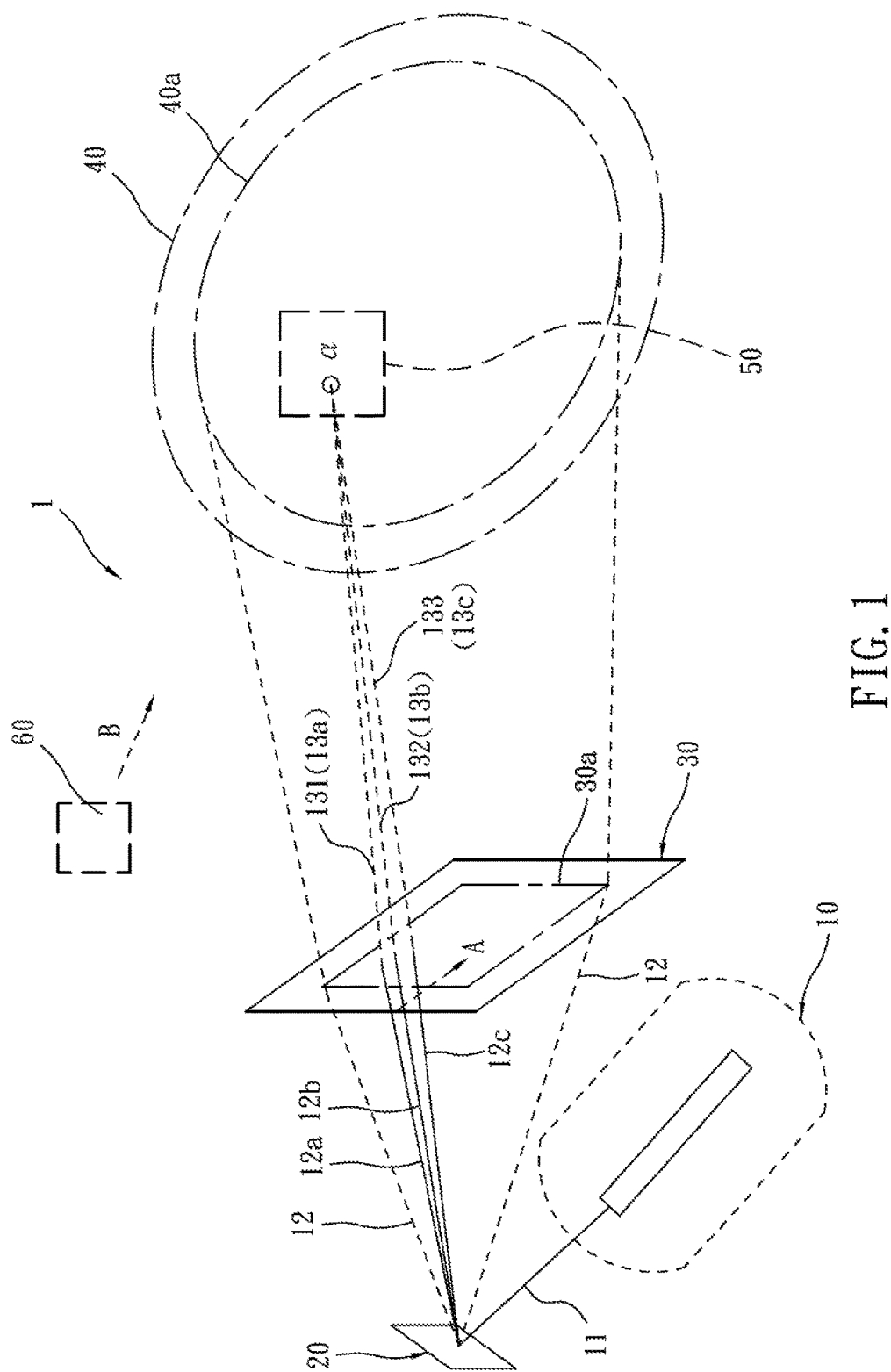
FIG. 1 is a schematic drawing showing a perspective view of an embodiment of a laser illumination system (having a laser module and a transmissive diffractive optical element) according to the present invention.

Refer to FIG. 1, a laser illumination system 1 mainly includes a laser module 10, a scanning unit 20, a diffractive optical element 30, an area to be illuminated 40/or at least one object 50 in the area to be illuminated 40, and at least one image detecting unit 60.

The laser module 10 can emit a laser beam 11. In this embodiment, the scanning unit 20 is a light-beam bending device that includes, but not limited to, a refractive index beam steering device, a reflecting mirror, a MEMS mirror, a MEMS rotating mirror, a rotating mirror, a polygon mirror, an ultrasonic grating and a combination thereof. The scanning unit 20 is used to scan the laser beam 11 along the scanning direction such as the arrow A indicates to form a plurality of scanning beams 12. Refer to FIG. 1, there are three scanning beams 12*a*, 12*b*, and 12*c* in this embodiment. The scanning beams 12*a*, 12*b*, and 12*c* are continuous scanning light beams formed by scanning of the scanning unit 20 at different time (different angles).

Still refer to FIG. 1, the diffractive optical element 30 allows the scanning beams 12 (12*a*, 12*b*, and 12*c*) to be incident into and diffracted therein in a transmissive way to form illuminating beams 13 (13*a*, 13*b*, and 13*c*). Then the illuminating beams 13 (13*a*, 13*b*, and 13*c*) are emitted to the area to be illuminated 40/or the object 50 in the area to be illuminated 40 for illumination. Thus the at least one image detecting unit 60 (in FIG. 1 but not limited) can capture the image of the area to be illuminated 40/or the object 50 in the area to be illuminated 40 along the direction the arrow B indicates (but not limited). The image detecting unit 60 can be human eyes or an optical sensor.

In FIG. 1, the scanning beams 12 (12*a*, 12*b*, and 12*c*) are converted into the illuminating beams 13 (13*a*, 13*b*, and 13*c*) by diffraction of the diffractive optical element 30 that results in changes in spatial phase redistribution or light energy distribution of the scanning beams 12 (12*a*, 12*b*, and 12*c*) while being passed through the diffractive optical element 30. Thus one point in the area to be illuminated 40 or on the object 50 in the area to be illuminated 40 such as the point α shown in FIG. 1 shows energy distribution of partial light of at least two of the illuminating beams 13 (13*a*, 13*b*, and 13*c*) within reaction time of the image detecting unit 60. As shown in FIG. 1, the three scanning beams 12a, 12b, and 12c are diffracted by the diffractive optical element 30 to form the three illuminating beams 13a, 13b, and 13c respectively. Thus within the reaction time of the image detecting unit 60, the point α in the area to be illuminated 40 or on the object 50 in the area to be illuminated 40 shows energy distribution of partial light 131 of the illuminating beam 13a, partial light 132 of the illuminating beam 13b and partial light 133 of the illuminating beam 13c. The energy of the partial light 131, 132, 133 is superposed at the point α. The image detecting unit 60 can be human eyes or an optical sensor. The reaction time of the image detecting unit 60 means how long the impression of an image remains on human eyes or the sensing and responding time of the optical sensor. In the present invention, the reaction time is defined as the shortest response time of the image detecting unit 60.

Figure 4:
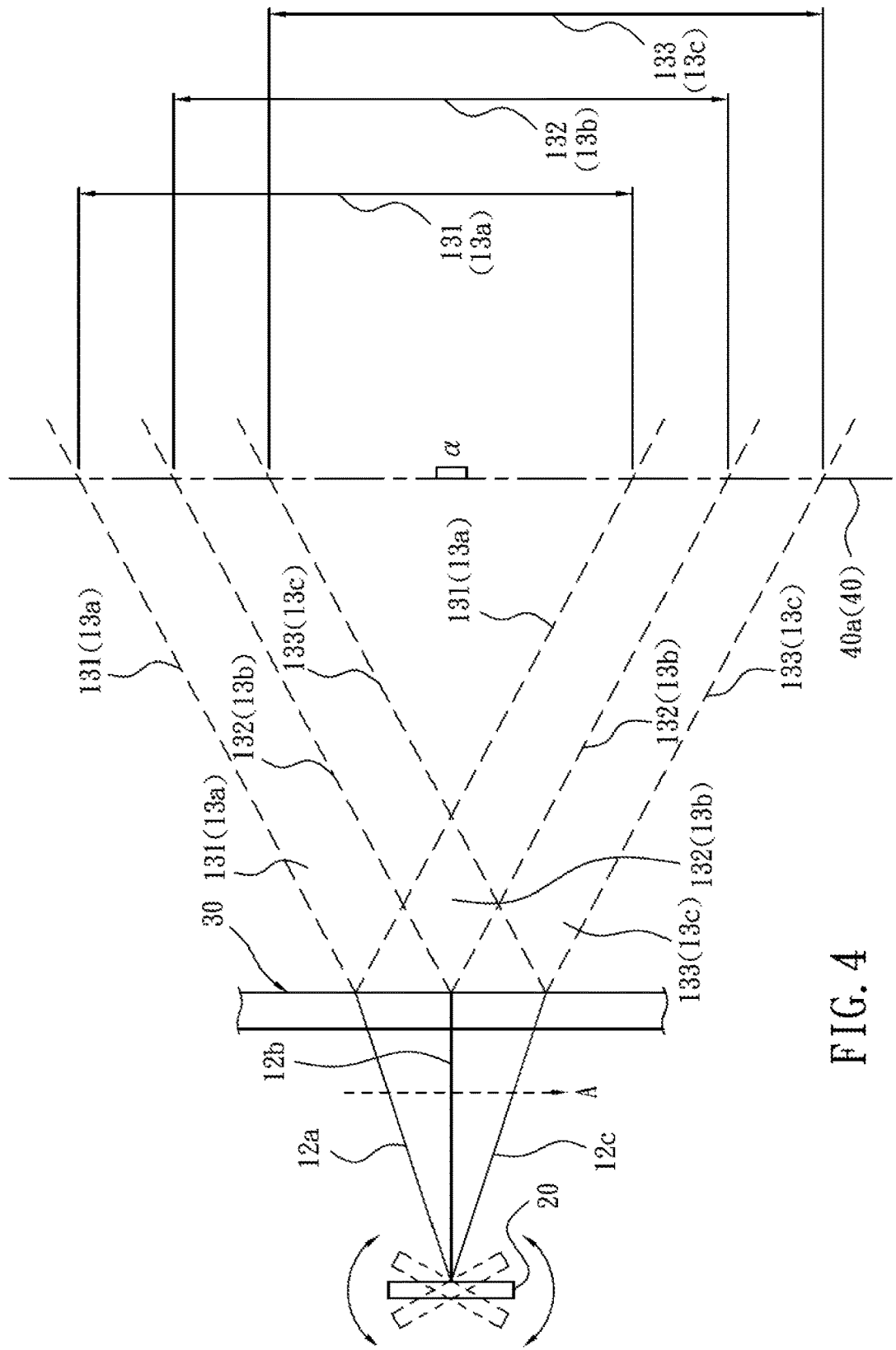
FIG. 4 is a schematic drawing showing light paths laser beams that are passed through scanning unit and emitted to an area to be illuminated (or effective illumination area) of an embodiment according to the present invention.

Also refer to FIG. 4, the three respective illuminating beams 13a, 13b, and 13c are formed by the three scanning beams 12a, 12b, and 12c passed through the diffractive optical element 30. The illumination zone of the three respective illuminating beams 13a, 13b, and 13c is enlarged due to diffraction (scattering) of the diffractive optical element 30. The partial light 131 is only a part of the illuminating beam 13a being diffracted/scattered, and so are the partial light 132 of the illuminating beam 13b and the partial light 133 of the illuminating beam 13c. Thus the point α in the area to be illuminated 40 or on the object 50 in the area to be illuminated 40 has the energy distribution of the partial light 131 of the illuminating beam 13a, the partial light 132 of the illuminating beam 13b and the partial light 133 of the illuminating beam 13c within the reaction time of the image detecting unit 60. Therefore a laser speckle of the image captured by the image detecting unit 60 can be eliminated by the superposition of the energy of the partial light 131, 132, 133.

Back to FIG. 1, the diffractive optical element 30 further includes an effective diffraction zone 30a. The scanning beams 12 are converted into the illuminating beams 13 by the effective diffraction zone 30a that provides diffraction effects and causes changes in spatial phase redistribution or light energy distribution thereof while being passed through the effective diffraction zone 30a. Thus the illuminating beams 13 form an effective illumination area 40a within the area to be illuminated 40.

Figure 3:
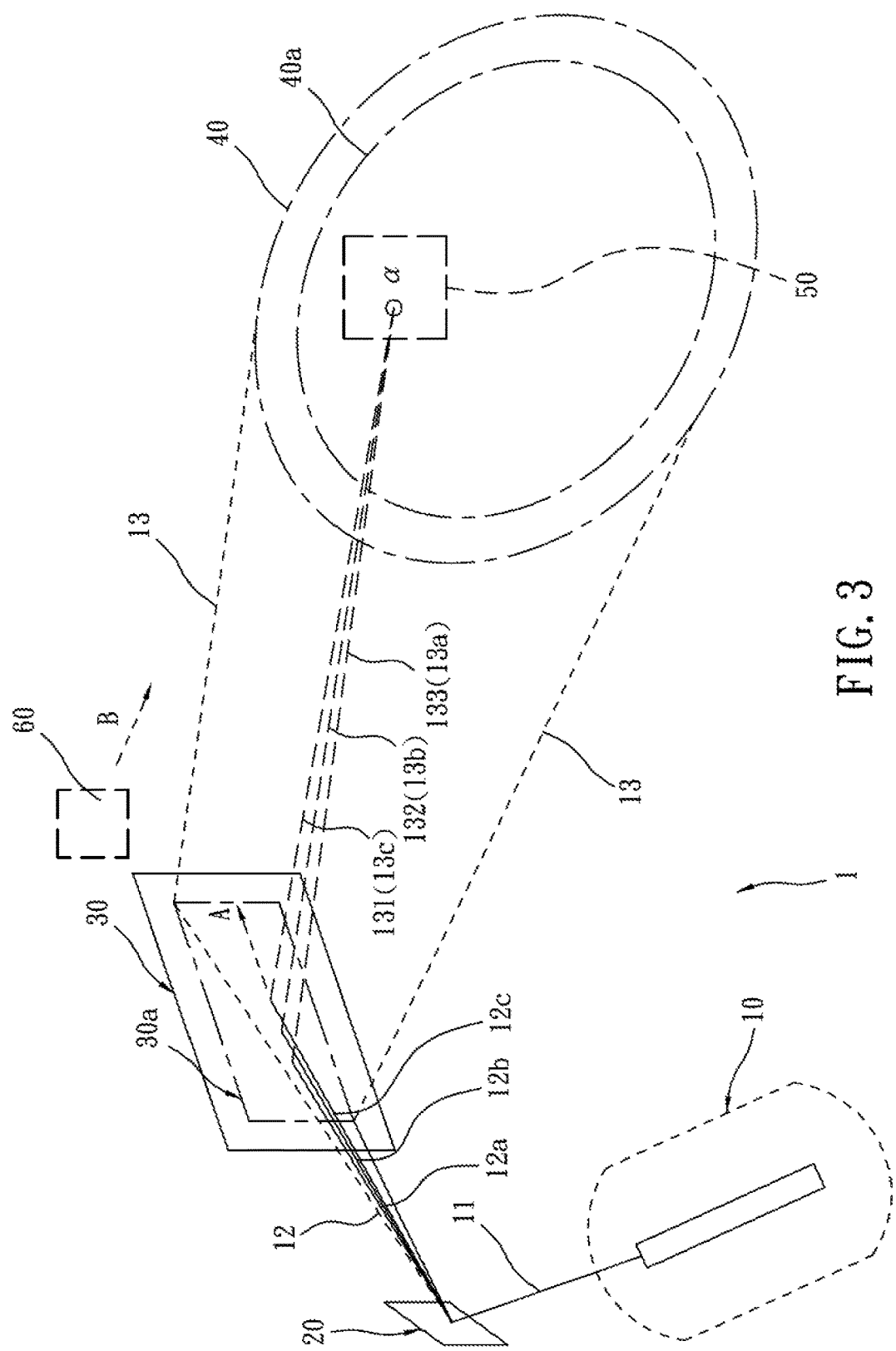
FIG. 3 is a perspective view of another embodiment of a laser illumination system (having a laser module and a reflective diffractive optical element) according to the present invention.

Refer to FIG. 3, an embodiment in this figure is different from the embodiment in FIG. 1 in that the embodiment in FIG. 1 uses the transmissive diffractive optical element 30 while the embodiment in FIG. 3 includes a reflective diffractive optical element. The laser illumination system and the method for eliminating laser speckles thereof of the embodiment in FIG. 3 are similar to those of the embodiment shown in FIG. 1.

Figure 2:
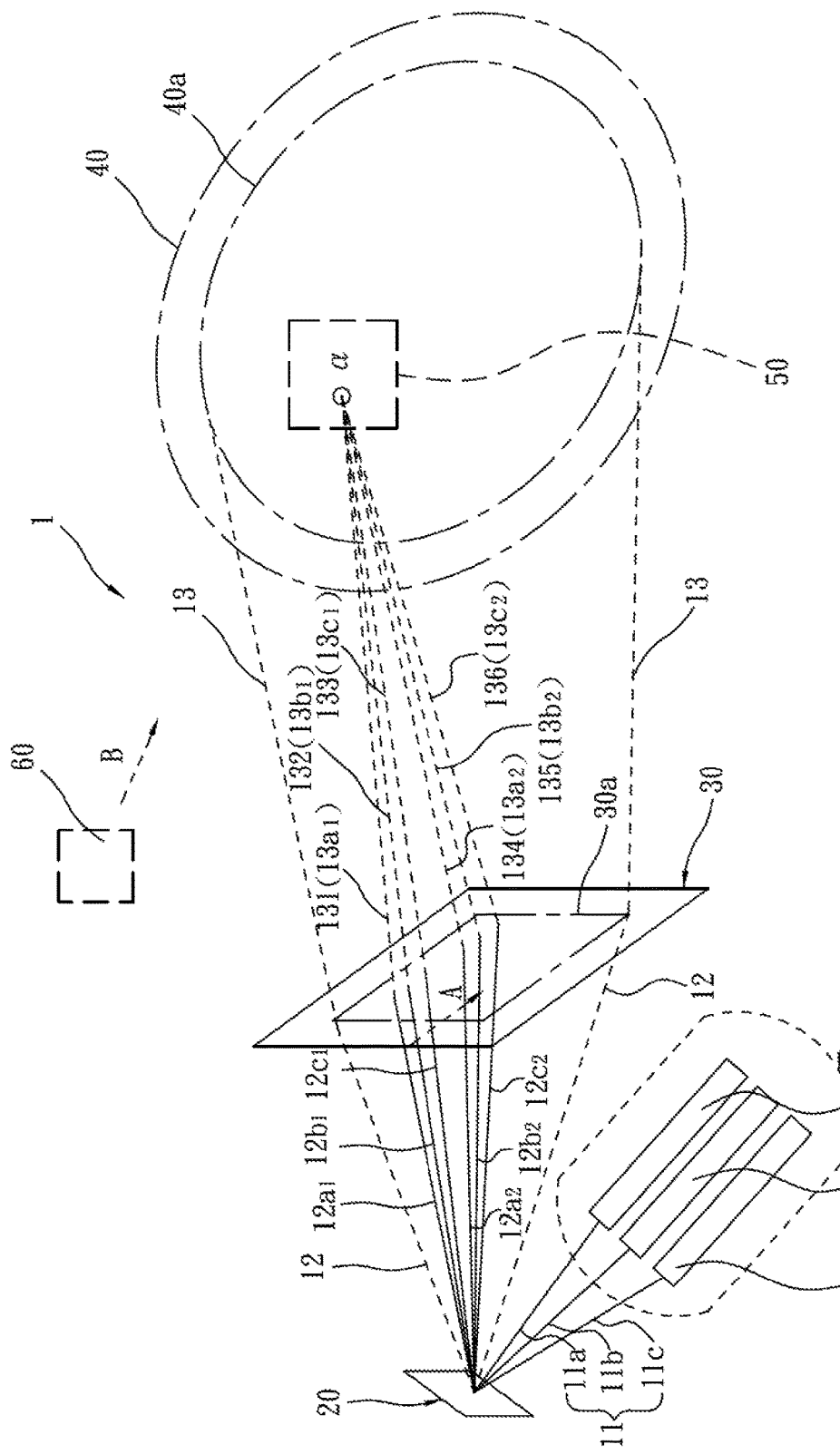
FIG. 2 is a schematic drawing showing an embodiment of a transmissive laser illumination system with a laser module matrix according to the present invention.

Refer to FIG. 2, the laser illumination system 1 mainly includes, but not limited to, a plurality of laser modules 10a, 10b, 10c, a scanning unit 20, a diffractive optical element 30, an area to be illuminated 40/or at least one object 50 in the area to be illuminated 40, and at least one image detecting unit 60.

In the laser illumination system 1 of this embodiment, the three different laser modules 10a, 10b, 10c form a laser module (10) matrix. Each laser module is further added with a collimator, a focusing element (not shown in figure), etc. for narrowing or limiting the laser beams more aligned in a specific direction to be projected to the scanning unit 20. The laser module (10) matrix can be further added with a plurality of sets of wavelength filters, a plurality of sets of polarizing filters (not shown in figure), etc for converting different laser beams into the same laser beam and performing time adjustment according to energy output of the laser.

Take the three laser modules 10a, 10b and 10c in FIG. 2 as an example. Each of the laser modules 10a, 10b, 10c emits a laser beam 11a, 11b, 11c respectively. In this embodiment, the laser module 10a, 10b, 10c can be, but not limited to, a RGB laser or a white light source. The scanning unit 20 is a light-beam bending device used for scanning the laser beams 11a, 11b, 11c along the scanning direction (such as the arrow A indicates, but not limited) to form a plurality of scanning beams 12. In the FIG. 2, there are six scanning beams 12a1, 12b1 12c1, 12a2, 12b2, and 12c2 that are continuously scanning light beams formed by the scanning unit 20 scanning at different time points.

In the FIG. 2, the diffractive optical element 30 allows the scanning beams 12 to be incident into and diffracted therein in a transmissive way to form illuminating beams 13. Then the illuminating beams 13 are projected to the area to be illuminated 40/or the object 50 in the area to be illuminated 40 for illumination. Thus at least one image detecting nit 60 (in FIG. 2 but not limited) is used to capture the image of the area to be illuminated 40/or the object 50 in the area to be illuminated 40 along the direction the arrow B indicates (but not limited). The image detecting unit 60 can be human eyes or an optical sensor. The diffractive optical element 30 includes a micro-optical diffractive element, a bulk optic, a diffuser and a combination thereof. The diffractive optical element 30 can be designed according to light energy and phase distribution required.

Still the FIG. 2, the scanning beams 12 are converted into the illuminating beams 13 by the diffractive optical element 30 that provides diffraction effect and causes changes in spatial phase redistribution or light energy distribution thereof. Thereby the point α in the area to be illuminated 40 or on the object 50 in the area to be illuminated 40 shown in FIG. 2 shows partial light of at least two of the illuminating beams 13 within the reaction time of the image detecting unit 60. In FIG. 2 there are six illuminating beams 13a1, 13b1, 13c1, 13a2, 13b2, and 13c2 formed by the diffraction of the scanning beams 121a1, 122b1 123c1, 121a2, 122b2, and 123c2 being passed through the diffractive optical element 30. Thus the point α in the area to be illuminated 40 or on the object 50 in the area to be illuminated 40 shows energy distribution of partial light 131 of the illuminating beam 13a1, partial light 132 of the illuminating beam 13b1, partial light 133 of the illuminating beam 13c1, partial light 134 of the illuminating beam 13a2, partial light 135 of the illuminating beam 13b2 and partial light 136 of the illuminating beam 13c2 within the reaction time of the image detecting unit 60. Therefore the superposition of the energy of the partial light 131, 132, 133, 134, 135, and 136 eliminates a laser speckle of the image captured by the image detecting unit 60.

Take the embodiment in FIG. 2 as an example. The partial light 131 is only a part of the illuminating beam 13a1 being diffracted/scattered by the diffractive optical element 30, and so are the partial light 132 of the illuminating beam 13b1, the partial light 133 of the illuminating beam 13c1, the partial light 134 of the illuminating beam 13a2, the partial light 135 of the illuminating beam 13b2, and the partial light 136 of the illuminating beam 13c2. Within the reaction time of the image detecting unit 60, the point α in the area to be illuminated 40 or on the object 50 in the area to be illuminated 40 shows the energy distribution of the partial light 131, 132, 133, 134, 135 and 136 and the superposition of the energy of the partial light 131, 132, 133, 134, 135 and 136 so as to eliminate the laser speckle of the image captured by the image detecting unit 60.

In the FIG. 2, the object is further located in an effective illumination area 40a when the area to be illuminated 40 further includes the effective illumination area 40a. The point α in the effective illumination area 40a/or on the object 50 in the effective illumination area 40a shows the energy distribution of the partial light 131, 132, 133, 134, 135 and 136 of the illuminating beams 13a1, 13b1, 13c1, 13a2, 13b2, and 13c2 respectively within the reaction time of the image detecting unit 60. Thus the laser speckle of the image captured by the image detecting unit 60 is eliminated by superposition of the energy of the partial light 131, 132, 133, 134, 135 and 136.

In the laser module (10) matrix in FIG. 2, the laser beams (11a, 11b, 11c) from the laser modules (10a, 10b and 10c) respectively are incident into the scanning unit 20 at different incident angles. Each laser module (10a, 10b or 10c) is composed of a plurality of sets of lasers with different wavelengths or a plurality of sets of polarized lasers. Moreover, the scanning path of the scanning unit 20 is cyclic and the scanning cycle of the scanning unit 20 is shorter than the reaction time of the image detecting unit 60. Thus the partial light of the illuminating beams 13 formed after diffraction of all the scanning beams 12 from the laser illumination system 1 is not only for illumination but also used to reduce the laser speckle of the image captured by the image detecting unit 60 significantly.

A method for eliminating laser speckles of a laser illumination system according to the present invention includes the following steps.

Step 1: providing a laser illumination system 1. The laser illumination system 1 includes at least one laser module 10 that emits laser beams 11, at least one scanning unit 20 used for scanning the laser beam 11 to form scanning beams 12, and at least one diffractive optical element 30 which the scanning beams 12 are passed through to form illuminating beams 13. Then the illuminating beams 13 are projected to an area to be illuminated 40/or at least one object 50 in the area to be illuminated 40 for illumination. Thus an image detecting unit 60 can capture an image of the area to be illuminated 40 or the object 50. The image detecting unit 60 can be human eyes or an optical sensor. The image detecting unit 60 has reaction time that is defined as how long the impression of an image remains on human eyes or the sensing and responding time of the optical sensor.

Step 2: converting the scanning beam 12 into the illuminating beam 13 by diffraction of the diffractive optical element 30 that causes changes in spatial phase redistribution or light energy distribution of the scanning beam 12 while the scanning beam 12 is passed through the diffractive optical element 30.

Step 3: eliminating a laser speckle of the image captured by the image detecting unit 60 by superposition of energy of partial light of at least two of the illuminating beams 13 shown on one point in the area to be illuminated 40 or on the object 50 in the area to be illuminated 40 within the reaction time of the image detecting unit 60.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

The invention claimed is:

1. A laser illumination system comprising:
at least one laser module that emits a laser beam;
at least one scanning unit used for scanning the laser beam to form scanning beams;
at least one diffractive optical element which the scanning beams are passed through to form illuminating beams; the illuminating beams being projected to an area to be illuminated or at least one object in the area to be illuminated for illumination so that at least one image detecting unit can capture an image of the area to be illuminated or the object;
wherein image detecting unit can be human eyes or an optical sensor; the image detecting unit has reaction time that is defined as how long an impression of an image remains on the human eyes, or sensing and responding time of the optical sensor; wherein the scanning beams are converted into the illuminating beams by diffraction of the diffractive optical element that causes changes in spatial phase redistribution or light energy distribution of the scanning beams while the scanning beams being passed through the diffractive optical element; thereby one point in the area to be illuminated or on the object in the area to be illuminated shows energy of partial light of at least two of the illuminating beams; thus a laser speckle of the image captured by the image detecting unit can be eliminated by superposition of the energy of the partial light of the illuminating beams;
wherein the diffractive optical element further includes an effective diffraction zone that causes changes in spatial phase redistribution or light energy distribution of the scanning beams and converts the scanning beams into the illuminating beams by diffraction effect thereof while the scanning beams being passed therethrough; thus the illuminating beams further form an effective illumination area within the area to be illuminated;
wherein the object is further located in an effective illumination area when the area to be illuminated further includes the effective illumination area; one point in the effective illumination area or the on the object in the effective illumination area shows energy of partial light of at least two of the illuminating beams within the reaction time of the image detecting unit so that a laser speckle of the image captured by the image detecting unit is eliminated by superposition of the energy of the partial light of the illuminating beams;
wherein the diffractive optical element is selected from the group consisting of a micro-optical diffractive element, a bulk optic, a diffuser and a combination thereof according to light energy and phase distribution required; but the diffractive optical element does not comprise any Electrically Switchable Bragg Grating (ESBG) element wherein said ESBG element is recorded in a Holographic Polymer Dispersed Liquid Crystal sandwiched between transparent substrates to which transparent conductive coatings have been applied;
wherein the scanning beams are passed through the diffractive optical element in a reflective way or in a transmissive way; and
wherein the scanning unit is a light-beam bending device and is selected from the group consisting of a refractive index beam steering device, a reflecting mirror, a MEMS mirror, a MEMS rotating mirror, a rotating mirror, a polygon mirror, an ultrasonic grating and a combination thereof.

2. A method for eliminating laser speckles of a laser illumination system comprising the steps of:

providing a laser illumination system; wherein the laser illumination system includes at least one laser module that emits a laser beam, at least one scanning unit used for scanning the laser beam to form scanning beams, and at least one diffractive optical element which the scanning beams are passed through to form illuminating beams; then the illuminating beams are projected to an area to be illuminated or at least one object in the area to be illuminated for illumination; thus an image detecting unit can capture an image of the area to be illuminated/or the object; the image detecting unit is able to be human eyes and or an optical sensor; the image detecting unit has reaction time that is defined as how long an impression of an image remains on the human eyes, or sensing and responding time of the optical sensor;

converting the scanning beam into the illuminating beam by diffraction of the diffractive optical element that causes changes in spatial phase redistribution or light energy distribution of the scanning beam while the scanning beam being passed through the diffractive optical element; and eliminating a laser speckle of the image captured by the image detecting unit by superposition of energy of partial light of at least two of the illuminating beams shown on one point in the area to be illuminated or on the object in the area to be illuminated within the reaction time of the image detecting unit;

wherein the diffractive optical element further includes an effective diffraction zone that causes changes in spatial phase redistribution or light energy distribution of the scanning beams and converts the scanning beams into the illuminating beams by diffraction effect thereof while the scanning beams being passed therethrough; thus the illuminating beams further form an effective illumination area within the area to be illuminated; and wherein the diffractive optical element is selected from the group consisting of a micro-optical diffractive element, a bulk optic, a diffuser and a combination thereof according to light energy and phase distribution required; but the diffractive optical element does not comprise any Electrically Switchable Bragg Grating (ESBG) element wherein said ESBG element is recorded in a Holographic Polymer Dispersed Liquid Crystal sandwiched between transparent substrates to which transparent conductive coatings have been applied.

* * * * *